US009845103B2

(12) United States Patent
Lubischer et al.

(10) Patent No.: US 9,845,103 B2
(45) Date of Patent: Dec. 19, 2017

(54) STEERING ARRANGEMENT (71) Applicant: Steering Solutions IP Holding Corporation, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/059,607

(22) Filed: Mar. 3, 2016

(65) Prior Publication Data

US 2016/0375926 A1 Dec. 29, 2016

Related U.S. Application Data (60) Provisional application No. 62/186,078, filed on Jun. 29, 2015.

(51) Int. Cl.
B62D 1/183 (2006.01)
B60R 11/02 (2006.01)
B60R 11/00 (2006.01)

(52) U.S. Cl.
CPC ............. *B62D 1/183* (2013.01); *B60R 11/02* (2013.01); *B60R 2011/001* (2013.01); *B60R 2011/0075* (2013.01); *B60R 2011/0094* (2013.01)

(58) Field of Classification Search
CPC .. B62D 1/183; B62D 1/06; B62D 1/10; B60R 11/0205; B60R 11/00; B60R 7/04; B60R 11/0252; B60R 2011/001; B60R 2011/0294
See application file for complete search history.

(56) References Cited

U.S. PATENT DOCUMENTS

| 3,011,802 A * | 12/1961 | Ackerman | B60R 7/08 224/276 |
| 3,643,606 A | 2/1972 | Vise | |
| 3,937,101 A * | 2/1976 | Wade | B60N 3/005 74/552 |
| 4,287,621 A * | 9/1981 | Kertz | B60N 3/00 224/276 |
| 4,337,967 A | 7/1982 | Yoshida et al. | |
| 4,453,788 A | 6/1984 | Russell | |
| 4,503,504 A | 3/1985 | Suzumura et al. | |
| 4,967,618 A | 11/1990 | Matsumoto et al. | |
| 5,060,581 A | 10/1991 | Malinski | |
| 5,181,759 A | 1/1993 | Doolittle | |

(Continued)

FOREIGN PATENT DOCUMENTS

| DE | 2025003 A | 12/1971 |
| DE | 102005053176 A1 | 10/2007 |

(Continued)

*Primary Examiner* — Darlene P Condra
(74) *Attorney, Agent, or Firm* — Cantor Colburn LLP (57) ABSTRACT A steering arrangement provided with an autonomous vehicle includes a steering wheel. The steering wheel is selectively coupled to a steering shaft. The steering wheel is selectively switched between a rotatable condition and a non-rotatable condition by an advanced driver assist system. The steering wheel has a steering wheel body defining a receptacle and a convenience assembly that is movable between an open position and a closed position.

17 Claims, 4 Drawing Sheets

(56) References Cited

U.S. PATENT DOCUMENTS

| | | | |
|---|---|---|---|
| 5,193,777 A * | 3/1993 | Faulstich | B60N 3/005 |
| | | | 108/44 |
| 5,295,712 A | 3/1994 | Omura | |
| 5,319,803 A | 6/1994 | Allen | |
| 5,555,502 A | 9/1996 | Opel | |
| 5,618,058 A | 4/1997 | Byon | |
| 5,662,047 A | 9/1997 | Metcalf | |
| 5,690,362 A | 11/1997 | Peitsmeier et al. | |
| 5,893,580 A | 4/1999 | Hoagland et al. | |
| 5,911,789 A | 6/1999 | Keipert et al. | |
| 6,170,862 B1 | 1/2001 | Hoagland et al. | |
| 6,227,425 B1 | 5/2001 | Ware, Sr. | |
| 6,227,571 B1 | 5/2001 | Sheng et al. | |
| 6,373,472 B1 | 4/2002 | Palalau et al. | |
| 6,390,505 B1 | 5/2002 | Wilson | |
| 6,669,233 B2 | 12/2003 | Gabriel | |
| 6,819,990 B2 | 11/2004 | Ichinose | |
| 7,048,305 B2 | 5/2006 | Muller | |
| 7,062,365 B1 | 6/2006 | Fei | |
| 7,295,904 B2 | 11/2007 | Kanevsky et al. | |
| 7,315,291 B2 * | 1/2008 | Yoshihara | B60R 11/0235 |
| | | | 345/1.1 |
| 7,461,863 B2 | 12/2008 | Muller | |
| 7,474,204 B2 | 1/2009 | Songwe | |
| 7,611,198 B2 | 11/2009 | Schweizer | |
| 7,735,405 B2 | 6/2010 | Parks | |
| 7,775,584 B2 | 8/2010 | Hughes et al. | |
| 7,793,980 B2 | 9/2010 | Fong | |
| 7,862,079 B2 | 1/2011 | Fukawatase et al. | |
| 7,894,951 B2 | 2/2011 | Norris et al. | |
| 8,002,075 B2 | 8/2011 | Markfort | |
| 8,079,312 B2 | 12/2011 | Long | |
| 8,146,945 B2 | 4/2012 | Born et al. | |
| 8,260,482 B1 | 9/2012 | Szybalski et al. | |
| 8,352,110 B1 | 1/2013 | Szybalski et al. | |
| 8,474,860 B2 | 7/2013 | Ohoka et al. | |
| 8,538,628 B2 | 9/2013 | Backman | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,132,787 B2 | 9/2015 | Cooper | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,333,983 B2 | 5/2016 | Lathrop et al. | |
| 9,352,752 B2 * | 5/2016 | Cullinane | B60W 30/00 |
| 9,360,865 B2 | 6/2016 | Yopp | |
| 9,442,289 B2 | 9/2016 | Nishima et al. | |
| 9,552,148 B2 | 1/2017 | Kim et al. | |
| 2002/0073899 A1 | 6/2002 | Chen | |
| 2003/0227159 A1 | 12/2003 | Muller | |
| 2005/0076815 A1 | 4/2005 | Twyford | |
| 2006/0146074 A1 | 7/2006 | Harrison | |
| 2006/0244251 A1 | 11/2006 | Muller | |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0099465 A1 | 5/2007 | Ruetz | |
| 2007/0205875 A1 | 9/2007 | De Haan | |
| 2007/0241548 A1 | 10/2007 | Fong | |
| 2010/0222976 A1 | 9/2010 | Haug | |
| 2010/0228417 A1 | 9/2010 | Lee et al. | |
| 2010/0288567 A1 | 11/2010 | Bonne | |
| 2012/0074674 A1 | 3/2012 | Ohoka et al. | |
| 2012/0136540 A1 | 5/2012 | Miller | |
| 2012/0287050 A1 | 11/2012 | Wu | |
| 2013/0002416 A1 * | 1/2013 | Gazit | B62D 1/28 |
| | | | 340/438 |
| 2013/0325202 A1 | 12/2013 | Howard et al. | |
| 2014/0111324 A1 | 4/2014 | Lisseman et al. | |
| 2014/0195096 A1 | 7/2014 | Schliep et al. | |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0032322 A1 | 1/2015 | Wimmer | |
| 2015/0051780 A1 | 2/2015 | Hahne | |
| 2015/0120142 A1 | 4/2015 | Park et al. | |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283926 A1 | 10/2015 | Hamdoon et al. | |
| 2015/0283998 A1 | 10/2015 | Lind et al. | |
| 2015/0324111 A1 | 11/2015 | Jubner et al. | |
| 2016/0001807 A1 | 1/2016 | Hans et al. | |
| 2016/0082867 A1 | 3/2016 | Sugioka et al. | |
| 2016/0114770 A1 * | 4/2016 | Lombrozo | B60T 8/17 |
| | | | 701/41 |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 * | 7/2016 | Sugioka | B62D 1/183 |
| | | | 74/493 |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1 * | 8/2016 | Bendewald | B60W 50/08 |
| 2016/0304123 A1 * | 10/2016 | Lewis | B62D 3/12 |
| 2016/0325662 A1 | 11/2016 | Nash | |
| 2016/0347347 A1 | 12/2016 | Lubischer | |
| 2016/0347348 A1 | 12/2016 | Lubischer | |
| 2016/0368522 A1 | 12/2016 | Lubischer et al. | |
| 2016/0375924 A1 | 12/2016 | Bodtker | |
| 2016/0375927 A1 | 12/2016 | Schulz et al. | |
| 2016/0375931 A1 | 12/2016 | Lubischer | |
| 2017/0029018 A1 | 2/2017 | Lubischer | |

FOREIGN PATENT DOCUMENTS

| | | |
|---|---|---|
| DE | 102010050699 A1 | 8/2011 |
| DE | 102016001257 A1 | 9/2016 |

\* cited by examiner

STEERING ARRANGEMENT

CROSS-REFERENCES TO RELATED APPLICATIONS

This patent application claims priority to U.S. Provisional Patent Application Ser. No. 62/186,078, filed Jun. 29, 2015, which is incorporated herein by reference in its entirety.

BACKGROUND

The present disclosure relates to a steering arrangement for a selectively autonomously controlled vehicle.

Vehicle steering wheels are typically used to steer a vehicle. With advancements in sensors, electronics and computers it may be possible for a vehicle to steer itself with an autonomous driving assisted steering system.

SUMMARY

According to an embodiment of the present invention, a steering arrangement in a selectively autonomous vehicle is provided. The steering arrangement includes a steering wheel and a controller. The steering wheel is selectively coupled to a steering shaft and has a driver convenience assembly movable between a closed position and an open position. The controller is in communication with an autonomous vehicle. The controller is programmed to, in response to a request to activate an advanced driver assist system, operatively decouple the steering wheel from the steering shaft and enable the driver convenience assembly to move from the closed position towards the open position.

According to another embodiment of the present invention, a steering arrangement is provided with an autonomous vehicle. The steering arrangement includes a steering wheel that is selectively coupled to a steering shaft. The steering wheel is selectively switched between a rotatable condition and a non-rotatable condition by an advanced driver assist system. The steering wheel has a body defining a receptacle and a convenience assembly movable between an open position and a closed position.

According to yet another embodiment of the present invention, a steering arrangement is provided. The steering arrangement includes a steering wheel provided in an autonomous vehicle. The steering wheel has a driver convenience assembly. The driver convenience assembly is enabled for use in response to activation of an advanced driver assist system and the steering wheel being in a non-rotatable condition.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
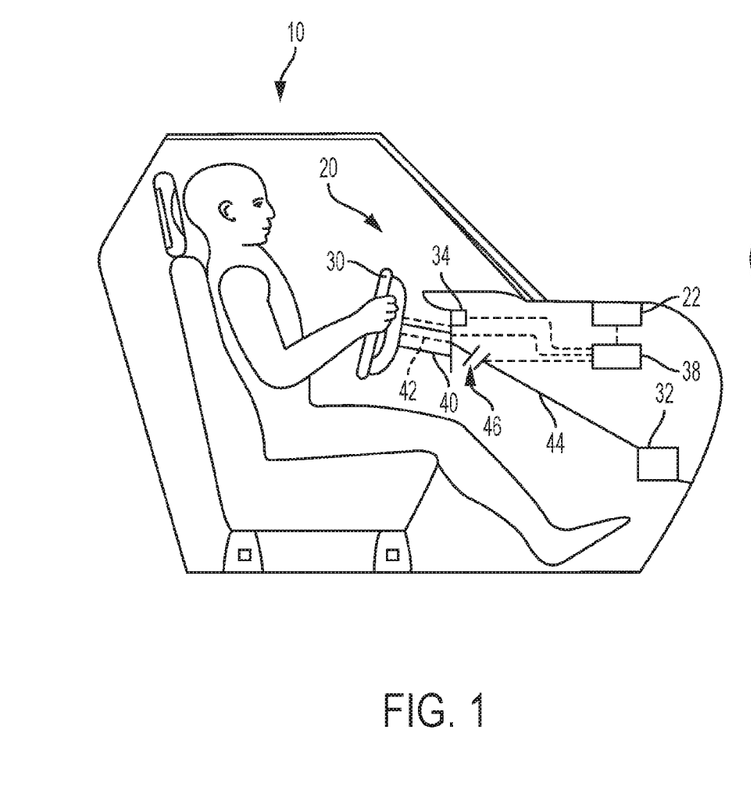
FIG. 1 a side view of a vehicle compartment having a steering arrangement in an extended position.
Figure 2:
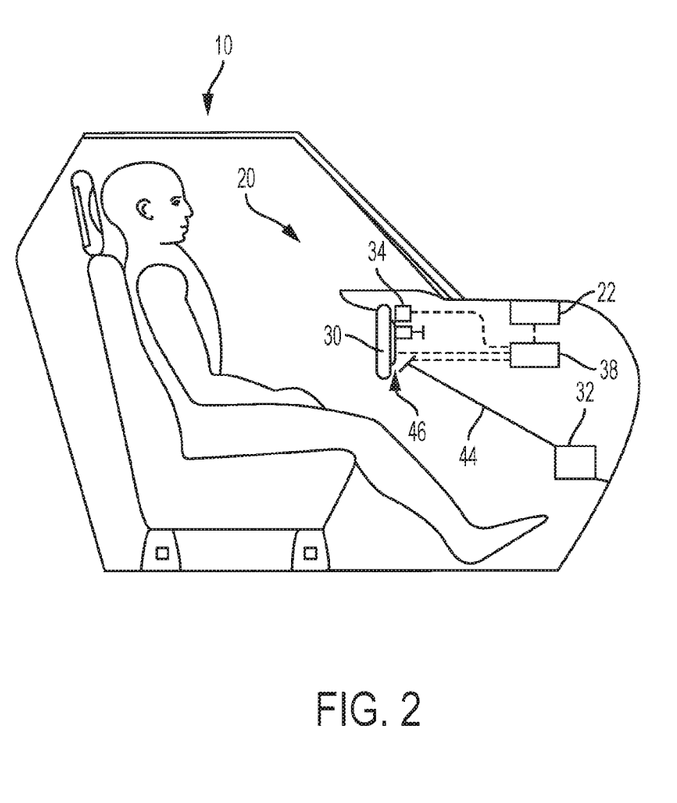
FIG. 2 is a side view of the vehicle compartment having the steering arrangement in a retracted position.

Referring to FIGS. 1 and 2, a side view of a space within an autonomous vehicle, an autonomously driven vehicle, or a selectively autonomous vehicle, such as a vehicle compartment 10, is shown. The autonomous vehicle, the autonomously driven vehicle, or the selectively autonomous vehicle is provided with a steering arrangement 20 and an autonomous driving assisted steering system (ADAS) 22. The ADAS 22 allows the selectively autonomous vehicle to be at least partially autonomously controlled using sensing, steering, and/or braking technology without continuous input from a driver (e.g. steering, accelerating, braking, maneuvering, etc.). A driver of the selectively autonomous vehicle is able to selectively activate or deactivate the ADAS 22 via a switch or other mechanism. A vehicle control system or monitoring system is able to selectively activate or deactivate the ADAS 22 in response to events occurring internal or external to the selectively autonomous vehicle.

The steering arrangement 20 includes a steering wheel 30, a steering gear 32, an adjustment assembly 34, a driver convenience assembly 36 (FIGS. 3 and 4), and a controller 38. The steering wheel 30 is connected to a steering column 40. The combination of the steering wheel 30 and the steering column 40 are adjustable such that the combination is extendable or retractable along a longitudinal axis 42 that extends through the steering column 40. The combination of the steering wheel 30 and the steering column 40 are tiltable relative to the longitudinal axis 42.

The steering wheel 30 is directly or indirectly selectively coupled to a steering shaft 44 connected to the steering gear 32. The steering wheel 30 is directly or indirectly selectively coupled to the steering shaft 44 by a coupling mechanism 46. The coupling mechanism 46 may include a disconnect clutch. The steering wheel 30 is coupled to the steering shaft 44 when the disconnect clutch of the coupling mechanism 46 is at least partially engaged and the ADAS 22 is deactivated. The steering wheel 30 is decoupled from the steering shaft 44 when the disconnect clutch of the coupling mechanism 46 is disengaged and the ADAS 22 is activated.

The rotation of the steering shaft 44 results in rotation or actuation of the steering gear 32 that pivots at least one vehicle wheel to steer or turn the selectively autonomous vehicle. The steering shaft 44 is rotated by the ADAS 22 or a driver input provided to the steering wheel 30.

In at least one embodiment, the coupling mechanism 46 is configured as a component of a steer by wire system that electrically couples the steering wheel 30 to the steering shaft 44 connected to the steering gear 32. The coupling mechanism 46 includes a device, such as a rotary encoder, that interprets rotation of the steering wheel 30 and applies the information to an actuator that rotates the steering shaft 44 connected to the steering gear 32 that pivots at least one vehicle wheel. The device provides a signal to the actuator when the ADAS 22 is deactivated. The device does not provide a signal or the signal is ignored by the actuator when the ADAS 22 is activated.

The steering wheel 30 is switchable between a rotatable condition and a non-rotating condition. The steering wheel 30 is in a rotatable condition when the ADAS 22 is deactivated. The driver of the selectively autonomous vehicle is able to provide directional control of the selectively autonomous vehicle through the steering wheel 30 when the ADAS 22 is deactivated. The steering wheel 30 is in a non-rotating condition when the ADAS 22 is activated. The steering wheel 30 is inhibited from rotating in the non-rotating condition. The steering wheel 30 is in the non-rotating condition when the steering wheel 30 is operatively decoupled from the steering shaft 44. In at least one embodiment, when the ADAS 22 is activated, the steering shaft 44 counter rotates such that no rotation of the steering wheel 30 is caused by the performance of steering maneuvers controlled by the ADAS 22. It is to be appreciated that "decoupling" the steering wheel 30 from the steering shaft 44 may be done mechanically, electrically, or a combination thereof.

The steering wheel 30 and the steering column 40 are movable between an extended position and a retracted position. The extended position corresponds to a position in which a driver of the selectively autonomous vehicle is able to provide steering input via the steering wheel 30, as shown in FIG. 1. The retracted position corresponds to a position in which the driver of the selectively autonomous vehicle is not required to provide steering input via the steering wheel 30, as shown in FIG. 2. The retracted position provides increased space within the vehicle compartment 10 for the driver of the selectively autonomous vehicle to perform non-driving activities.

The steering wheel 30 is movable between the extended position and the retracted position by the adjustment assembly 34. The adjustment assembly 34 is in communication with the controller 38. The adjustment assembly 34 includes an actuator and an extension member. The actuator is disposed proximate the steering column 40. In at least one embodiment, the actuator is disposed within the selectively autonomous vehicle's instrument panel. The actuator is at least one of an electronic actuator, a hydraulic actuator, a pneumatic actuator, or the like.

The extension member is operatively coupled to the actuator and at least one of the steering wheel 30 and the steering column 40. The extension member is at least one of a lead screw, a sliding shaft, a telescoping shaft, or the like. The actuator and the extension member are arranged to move the steering wheel 30 and the steering column 40 between the extended position and the retracted position.

The adjustment assembly 34 is configured to move the steering wheel 30 and the steering column 40 from the retracted position towards the extended position in response to a request to deactivate the ADAS 22. As the steering wheel 30 moves towards the extended position or subsequent to the steering wheel 30 achieving the extended position, the coupling mechanism 46 operatively couples the steering wheel 30 to the steering shaft 44 connected to the steering gear 32.

The adjustment assembly 34 is configured to move the steering wheel 30 and the steering column 40 from the extended position towards the retracted position in response to a request to activate the ADAS 22. As the steering wheel 30 moves towards the retracted position or prior to the steering wheel 30 moving towards the retracted position, the coupling mechanism 46 operatively decouples the steering wheel 30 from the steering shaft 44 connected to the steering gear 32.

The selective activation of the ADAS 22 results in the steering wheel 30 becoming operatively decoupled from the steering shaft 44 and the steering gear 32. The steering wheel 30 switches from a rotatable condition to a non-rotatable condition, in response to the operative decoupling of the steering wheel 30 from the steering shaft 44 connected to the steering gear 32. The steering wheel 30 and the steering column 40 moves from the extended position towards the retracted position, in response to the steering wheel 30 being in a non-rotatable condition.

Figure 3:
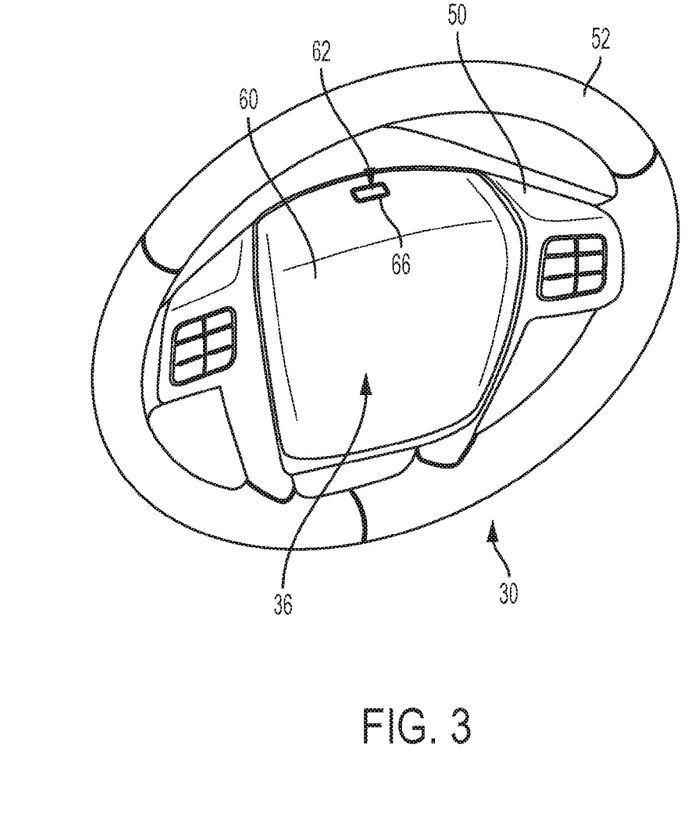
FIG. 3 is a perspective view of a steering wheel having a first embodiment of a driver convenience assembly in a closed position.
Figure 4:
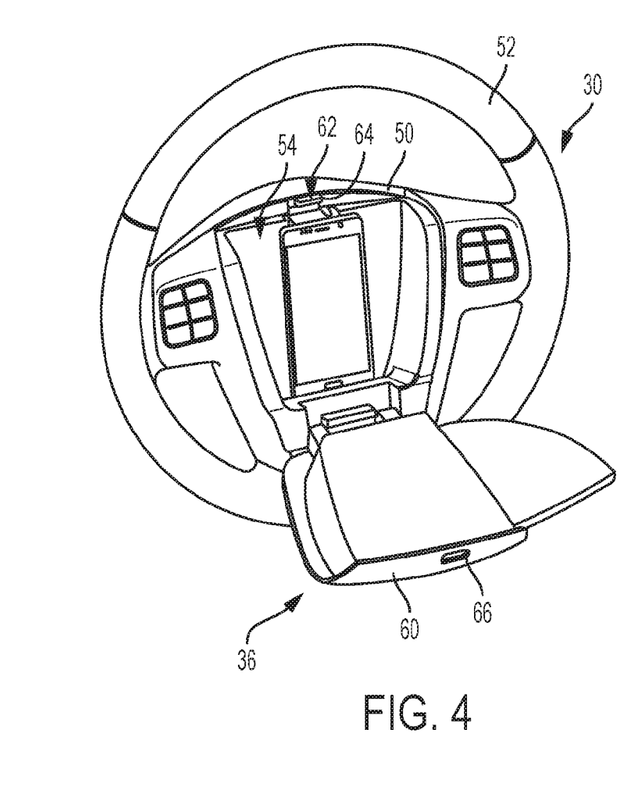
FIG. 4 is a perspective view of the steering wheel having the first embodiment of the driver convenience assembly in an open position.

Referring to FIGS. 3 and 4, the steering wheel 30 includes a steering wheel body 50 and a rim 52 that extends at least partially around the steering wheel body 50. The steering wheel body 50 defines a receptacle or a recess 54. The recess 54 is configured to receive a mobile electronic device, cellular phone, a two-way radio, a tablet computing device, a portable electronic device, a book, a notepad, or the like. It is to be understood that the preceding list of examples is not exhaustive and is merely illustrative of objects or devices that may be inserted into the recess 54.

The driver convenience assembly 36 is movable between a closed position and an open position. The driver convenience assembly 36 is configured to cover the recess 54 when in the closed position. The driver convenience assembly 36 is configured to permit access to the recess 54 when in the open position.

The driver convenience assembly 36 is integral to the steering wheel 30 or the steering column 40. The driver convenience assembly 36 includes a cover 60 and a locking mechanism 62. The cover 60 is coupled to at least one of the steering wheel body 50 and the rim 52. The cover 60 is configured as a tray table, a work surface, a platform, a cover having a cup holder, or the like when in the open position. The combination of the cover 60 and the recess 54 defines a storage compartment.

The locking mechanism 62 is disposed on the steering wheel body 50. The locking mechanism 62 includes a locking element 64. Locking element 64 extends through an opening 66 defined by the cover 60 when the cover is in the closed position. The locking element 64 of the locking mechanism 62 inhibits movement of the cover 60 away from the closed position while the ADAS 22 is deactivated, the steering wheel 30 is in a rotatable condition, and/or the steering wheel 30 is operatively coupled to the steering shaft 44 connected to the steering gear 32.

The locking element 64 is enabled to be depressed or moved such that the cover 60 is movable from the closed position towards the open position. The locking element 64 of the locking mechanism 62 is enabled to be moved while the ADAS 22 is activated, the steering wheel 30 is in a non-rotatable condition, and the steering wheel 30 is operatively decoupled from the steering shaft 44 connected to the steering gear 32.

Figure 5:
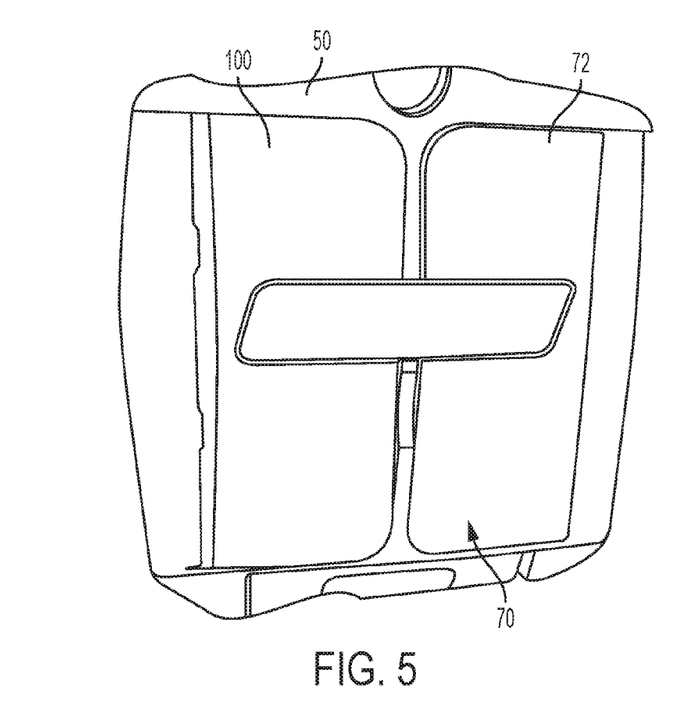
FIG. 5 is a perspective view of the steering wheel having a second embodiment of a driver convenience assembly in a closed position.
Figure 6:
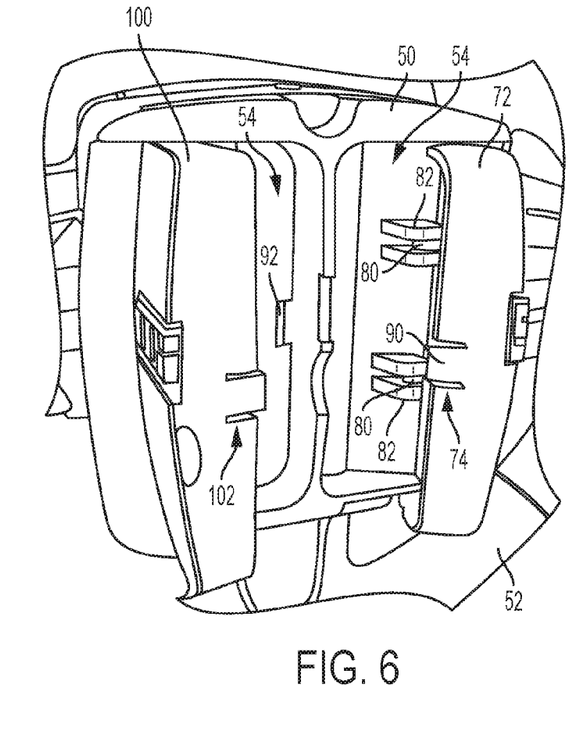
FIG. 6 is a perspective view of the steering wheel having the second embodiment of the driver convenience assembly in an open position.

Referring to FIGS. 5 and 6, a second embodiment of a driver convenience assembly 70 is shown. The driver convenience assembly 70 includes a door 72 pivotally connected to the steering wheel body 50 and a latching mechanism 74. The door 72 is configured to cover or conceal the recess 54 or secure items that are placed within the recess 54 of the steering wheel body 50. The door 72 is movable between a closed position that inhibits access to the recess 54 and an open position that permits access to the recess 54.

The door 72 includes an extension portion 80 that is disposed opposite the latching mechanism 74. The extension portion 80 is received within a receiving portion 82 disposed within the recess 54. The extension portion 80 and the receiving portion 82 have a tab and slot configuration, respectively. The extension portion 80 and the receiving portion 82 form a hinge that connects the door 72 to the steering wheel body 50.

The latching mechanism 74 inhibits the door 72 from moving away from the closed position. The latching mechanism 74 is laterally centered across the steering wheel body 50. The latching mechanism 74 is disposed proximate an edge of the recess 54. The latching mechanism 74 includes a tab or finger 90 that extends from an end of the door 72. The finger 90 is releasably received within a slot 92. The slot 92 is defined by a sidewall of the recess 54 or defined by an interior wall of the recess 54. In at least one embodiment, the latching mechanism 74 includes a bayonet that extends from an end of the door 72 that is received within a clasp disposed within the recess 54.

The door 72 is enabled to move from the closed position towards the open position in response to the steering wheel 30 being decoupled from the steering shaft 44 connected to the steering gear 32, the steering wheel 30 being in a non-rotatable condition, and the ADAS 22 being activated. The door 72 is inhibited from moving away from the closed position in response to the steering wheel 30 being coupled to the steering shaft 44 connected to the steering gear 32, the steering wheel 30 being in a rotatable condition, and/or the ADAS 22 being deactivated.

In at least one embodiment, the driver convenience assembly 70 includes a second door 100 and a second latching mechanism 102. The second door 100 and the second latching mechanism 102 have a substantially similar, but mirrored configuration as the door 72 and the latching mechanism 74. The second door 100 is spaced apart from the door 72.

The controller 38 may be provided as part of the ADAS 22. In at least one embodiment, the controller 38 is provided as a separate component from the ADAS 22 and is in communication with the autonomous vehicle, the autonomously driven vehicle, or the selectively autonomous vehicle. The controller 38 is configured to receive information or signals from the ADAS 22, a sensor associated with the ADAS 22, the steering wheel 30, the adjustment assembly 34, the driver convenience assembly (36, 70, 110), the steering shaft 44, and the coupling mechanism 46.

The controller 38 interprets the various signals provided by the steering arrangement 20 and the ADAS 22 to determine whether to activate or deactivate the ADAS 22. The controller 38 issues commands to and receive signals from the steering arrangement 20, the ADAS 22, the steering wheel 30, the adjustment assembly 34, the driver convenience assembly (36, 70, 110), the steering shaft 44, and the coupling mechanism 46. These commands and signals may result in the steering wheel 30 being operatively coupled or operatively decoupled from the steering shaft 44 connected to the steering gear 32, and the steering wheel 30 and the steering column 40 being in a retracted position or a deployed position, the steering wheel 30 being a rotating condition or a non-rotating condition.

The controller 38 includes a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 38 in controlling the steering arrangement 20 and the ADAS 22.

Figure 7:
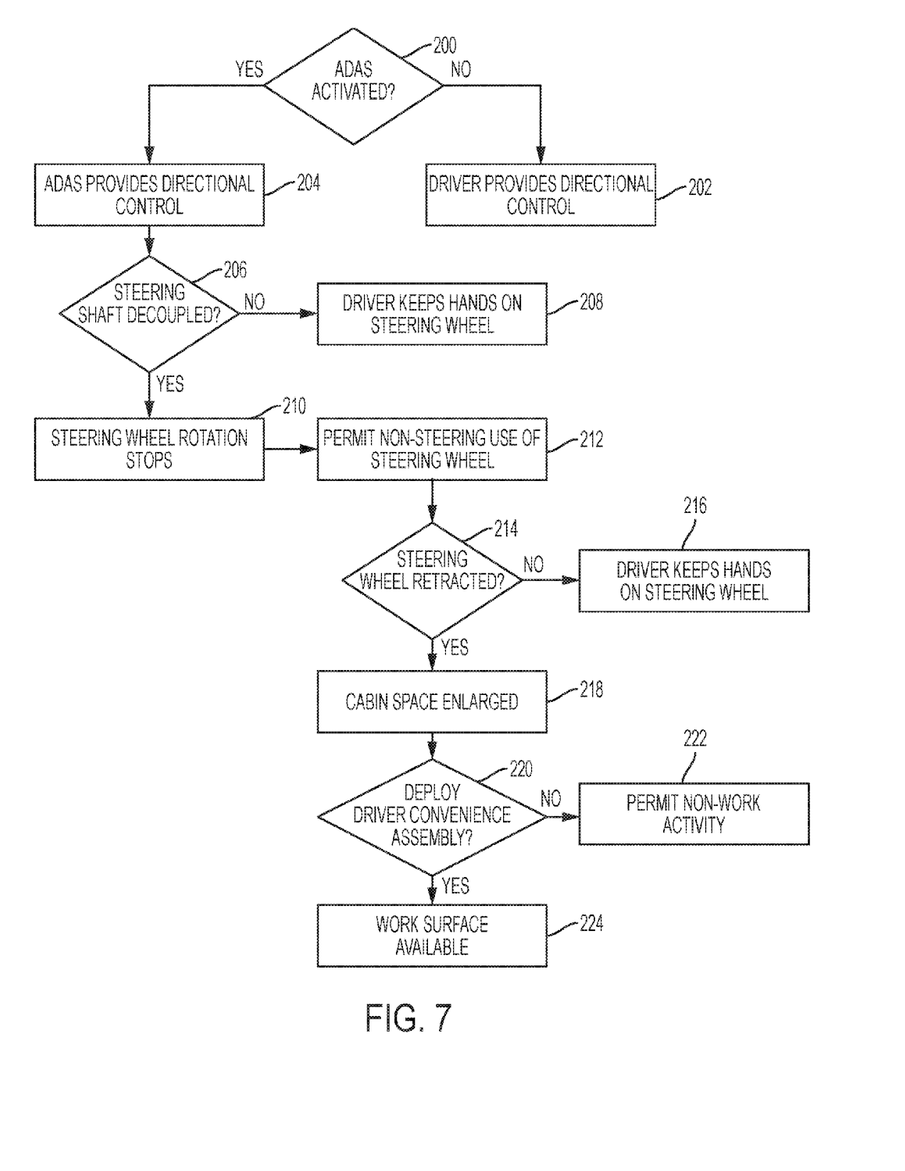
FIG. 7 is a flowchart illustrating a method deploying a driver convenience assembly.

Referring to FIG. 7, a flowchart illustrating a method of deploying a driver convenience assembly in a selectively autonomous vehicle is shown. As will be appreciated by one of ordinary skill in the art, the flowchart represents control logic that may be implemented or affected in hardware, software, or a combination of hardware and software. The various functions may be affected by a programmed microprocessor provided with the controller 38 or provided separately from the controller 38. The control logic may be implemented using any of a number of known programming and processing techniques or strategies and is not limited to the order or sequence illustrated. For instance, interrupt or event driven processing may be employed in real-time control applications rather than a purely sequential strategy is illustrated. Likewise, parallel processing, multitasking, or multi-threaded systems and methods may be used.

The method may be executed by the controller 38 and may be implemented as a closed loop control system. For brevity, the method will be described in the context of a single method iteration below. The method assesses the operating state of the selectively autonomous vehicle, which may include assessing whether the selectively autonomous vehicle is functional, the operational state of the ADAS 22, the position of the steering wheel 30, the rotatable or non-rotatable condition of the steering wheel 30, or the enablement of the driver convenience assembly 36, 70.

At block 200, the method assesses whether the ADAS 22 is activated. If the ADAS 22 is not activated, the method continues to block 202. At block 202, the driver of the selectively autonomous vehicle provides directional control of the selectively autonomous vehicle. The driver of the selectively autonomous vehicle provides steering or other inputs via the steering wheel 30 and the method may end. Should the ADAS 22 be activated, the method continues to block 204. At block 204, the ADAS 22 provides directional control to the selectively autonomous vehicle.

At block 206, the method assesses whether the steering wheel 30 is decoupled or uncoupled from at least one of the steering gear 32 and the steering shaft 44 or the steering shaft 44 is decoupled or uncoupled from the steering gear 32. At block 208, if the driver of the selectively autonomous vehicle keeps their hands on the steering wheel 30, the steering wheel 30 may not be decoupled or uncoupled from at least one of the steering gear 32 and the steering shaft 44, the method may end.

Should the steering wheel 30 be virtually or literally uncoupled from at least one of the steering gear 32 and a steering shaft 44 or the steering shaft 44 be uncoupled from the steering gear 32, the method continues to block 210. At block 210, the rotation of the steering wheel 30 stops. The steering wheel 30 changes from a rotatable condition to a non-rotatable condition, where the steering wheel 30 is not used to provide directional control of the selectively autonomous vehicle or is counter-rotated by a servo actuator. At block 212, the method permits a non-steering use of the steering wheel 30, in response to the steering wheel 30 being in a non-rotatable condition.

At block 214, the method determines whether the steering wheel is in an extended position or a retracted position. At block 216, if the driver of the selectively autonomous vehicle keeps their hands on the steering wheel 30, the steering wheel 30 may not be moved from the extended position towards the retracted position and the method may end. Should the driver of the selectively autonomous vehicle not have their hands on the steering wheel, the steering wheel 30 is moved from the extended position towards the retracted position to enlarge cabin space within the vehicle compartment 10 at block 218. The steering wheel 30 and the steering column 40 are displaced forward within the vehicle compartment 10 to enlarge cabin space.

At block 220, the method determines whether to deploy the driver convenience assembly. If at least one of the steering wheel 30 being in the retracted position, the steering wheel 30 being in a non-rotatable condition, and a driver of the selectively autonomous vehicle does not have their hands on the steering wheel 30 is not met, the method continues to block 222. At block 222, the method permits non-work activities that do not utilize the driver convenience assembly and the method may end. Should at least one of the steering wheel 30 being in the retracted position, the steering wheel 30 being in a non-rotatable condition, and a driver of the selectively autonomous vehicle does not have their hands on the steering wheel 30 is met, the method continues to block 224. At block 224, the method permits or enables a work surface of the driver convenience assembly to be made available for use by the driver of the selectively autonomous vehicle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering arrangement in a selectively autonomous vehicle, comprising:
    a steering wheel selectively coupled to a steering shaft, the steering wheel having a driver convenience assembly movable between a closed position and an open position; and
    a controller in communication with the vehicle, the controller programmed to, in response to a request to activate an advanced driver assist system, operatively decouple the steering wheel from the steering shaft and enable the driver convenience assembly to move from the closed position towards the open position.

2. The steering arrangement of claim 1, wherein the controller is further programmed to, in response to the request to activate the advanced driver assist system, inhibit rotation of the steering wheel.

3. The steering arrangement of claim 1, wherein the controller is further programmed to, in response to the request to activate the advanced driver assist system, move the steering wheel from an extended position towards a retracted position.

4. The steering arrangement of claim 1, wherein the driver convenience assembly includes a cover coupled to at least one of a steering wheel body and a rim that extends at least partially about a steering wheel body.

5. The steering arrangement of claim 4 wherein the steering wheel body defines a receptacle that is covered by the cover when in the closed position.

6. The steering arrangement of claim 4, wherein the driver convenience assembly includes a locking mechanism coupled to the steering wheel body, the locking mechanism inhibiting movement of the cover away from the closed position while the advanced driver assist system is deactivated.

7. A steering arrangement provided with an autonomous vehicle, comprising:
    a steering wheel, selectively coupled to a steering shaft and selectively switched between a rotatable condition and a non-rotatable condition by an advanced driver assist system, the steering wheel having:
        a steering wheel body defining a receptacle; and
        a convenience assembly that includes a door pivotally connected to the steering wheel body, the door is enabled to move from a closed position towards an open position in response to the steering wheel being decoupled from the steering shaft and the steering wheel being in the non-rotatable condition.

8. A steering arrangement provided with an autonomous vehicle, comprising:
    a steering wheel, selectively coupled to a steering shaft and selectively switched between a rotatable condition and a non-rotatable condition by an advanced driver assist system, the steering wheel having:
        a steering wheel body defining a receptacle; and
        a convenience assembly that includes a door pivotally connected to the steering wheel body, the door being movable between a closed position and an open position, the door is inhibited from moving away from the closed position while the steering wheel is operatively coupled to the steering shaft and the steering wheel being in the rotatable condition.

9. A steering arrangement, comprising:
    a steering wheel is provided with an autonomous vehicle, the steering wheel having a driver convenience assembly, the driver convenience assembly is enabled for use in response to activation of an advanced driver assist system and the steering wheel being in a non-rotatable condition.

10. The steering arrangement of claim 9, further comprising an adjustment assembly that translates the steering wheel from an extended position towards a retracted position, in response to a request to activate the advanced driver assist system.

11. The steering arrangement of claim 10, wherein when the steering wheel is in the retracted position the steering wheel is in the non-rotatable condition.

12. The steering arrangement of claim 10, wherein when the steering wheel is in the retracted position the steering wheel is operatively decoupled from a steering shaft.

13. The steering arrangement of claim 9, wherein the driver convenience assembly includes:

a panel connected to a steering wheel body, the panel being movable between a closed position and an open position; and an extensible member received within a recess defined by the steering wheel body and connected to the steering wheel body, the extensible member movable between a stowed position and a deployed position.

14. The steering arrangement of claim 13, wherein the panel is enabled to move between the closed position and the open position when the steering wheel is in the non-rotatable condition and the advanced driver assist system is activated.

15. The steering arrangement of claim 13, wherein the extensible member is movable between the stowed position and the deployed position when the panel is in the open position.

16. The steering arrangement of claim 13, wherein the extensible member defines a working surface and a stop surface disposed opposite the working surface.

17. The steering arrangement of claim 16, wherein the stop surface engages a rim of the steering wheel when the extensible member is in the deployed position.

\* \* \* \* \*